United States Patent
Sim et al.

(10) Patent No.: US 11,399,178 B2
(45) Date of Patent: *Jul. 26, 2022

(54) METHOD AND DEVICE FOR TRANSMITTING BLOCK DIVISION INFORMATION IN IMAGE CODEC FOR SECURITY CAMERA

(71) Applicant: GOLDENWAVEPARTNERS CO., LTD., Gimpo-si (KR)

(72) Inventors: Donggyu Sim, Seoul (KR); Yongjo Ahn, Seoul (KR); Seanae Park, Seoul (KR)

(73) Assignee: GOLDENWAVEPARTNERS CO., LTD., Gimpo-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,264

(22) Filed: Nov. 20, 2020

(65) Prior Publication Data

US 2021/0076037 A1    Mar. 11, 2021

Related U.S. Application Data

(63) Continuation of application No. 16/282,291, filed on Feb. 21, 2019, now Pat. No. 10,887,591, which is a
(Continued)

(30) Foreign Application Priority Data

Aug. 22, 2016   (KR) .................. 10-2016-0105955

(51) Int. Cl.
*H04N 19/119* (2014.01)
*H04N 19/70* (2014.01)
(Continued)

(52) U.S. Cl.
CPC ............ *H04N 19/119* (2014.11); *H04N 7/18* (2013.01); *H04N 7/183* (2013.01);
(Continued)

(58) Field of Classification Search
CPC ...... H04N 19/119; H04N 19/11; H04N 19/46; H04N 19/70
See application file for complete search history.

(56) References Cited

U.S. PATENT DOCUMENTS 8,929,455 B2   1/2015   Cohen et al.
9,503,758 B2   11/2016  Jang
(Continued)

FOREIGN PATENT DOCUMENTS

KR   10-20100030671 A   3/2010
KR   10-20110036519 A   4/2011
(Continued)

OTHER PUBLICATIONS

WD1 Working Draft 1 of High Efficiency Video coding; Oct. 2010; Wiegand. (Year: 2010).*
(Continued)

*Primary Examiner* — Luis Perez-Fuentes
(74) *Attorney, Agent, or Firm* — Sughrue Mion, PLLC

(57) ABSTRACT

The present invention relates to a method and device for transmitting block division information for efficient image coding in a video compression technique for a high-definition security camera. To this end, the present invention obtains block division information from a bitstream, determines the division form of an image by computing and predicting omitted information if there is omitted information in the obtained information, and performs video decoding in the unit of a divided block.

5 Claims, 5 Drawing Sheets

Related U.S. Application Data continuation of application No. PCT/KR2016/010879, filed on Sep. 29, 2016.

(51) Int. Cl.
   *H04N 7/18* (2006.01)
   *H04N 19/176* (2014.01)
   *H04N 19/44* (2014.01)
   *H04N 19/124* (2014.01)
   *H04N 19/46* (2014.01)
   *H04N 19/91* (2014.01)

(52) U.S. Cl.
   CPC ......... *H04N 19/124* (2014.11); *H04N 19/176* (2014.11); *H04N 19/44* (2014.11); *H04N 19/46* (2014.11); *H04N 19/70* (2014.11); *H04N 19/91* (2014.11)

(56) References Cited

U.S. PATENT DOCUMENTS

| | | | |
|---|---|---|---|
| 9,532,058 B2* | 12/2016 | Chien | H04N 19/176 |
| 9,635,368 B2* | 4/2017 | Kim | H04N 19/149 |
| 9,807,424 B2 | 10/2017 | Guo et al. | |
| 9,860,529 B2* | 1/2018 | Zhang | H04N 19/174 |
| 9,967,587 B2 | 5/2018 | Song et al. | |
| 10,178,395 B2* | 1/2019 | Joshi | H04N 19/13 |
| 10,250,881 B2* | 4/2019 | Song | H04N 19/615 |
| 10,887,591 B2* | 1/2021 | Sim | H04N 19/44 |
| 2013/0101025 A1 | 4/2013 | Van Der Auwera et al. | |
| 2014/0307795 A1 | 10/2014 | Chen et al. | |
| 2015/0334407 A1 | 11/2015 | Rusert | |
| 2019/0191158 A1* | 6/2019 | Sim | H04N 19/176 |

FOREIGN PATENT DOCUMENTS

| | | |
|---|---|---|
| KR | 10-20130140066 A | 12/2013 |
| KR | 10-20150051204 A | 5/2015 |

OTHER PUBLICATIONS

Block partitioning structure in the HEVC standard; Kim; 2012. (Year: 2012).*
Library USPTO NPL query; 2022 (Year: 2022).*
NPL Google Search; 2022. (Year: 2022).*
Working Draft 1 of High Efficiency Video coding; Wiegand; 2010 (Year: 2010).
International Search Report, PCT/KR2016/010879, dated May 16, 2017, 15 pgs.

* cited by examiner

METHOD AND DEVICE FOR TRANSMITTING BLOCK DIVISION INFORMATION IN IMAGE CODEC FOR SECURITY CAMERA

RELATED APPLICATIONS

This is a continuation of U.S. application Ser. No. 16/282,291 filed Feb. 21, 2019, which is a continuation application of the International Patent Application Serial No. PCT/KR2016/010879, filed Sep. 29, 2016, which claims priority to the Korean Patent Application Serial No. 10-2016-0105955, filed Aug. 22, 2016. Both of these applications are incorporated by reference herein in their entireties.

TECHNICAL FIELD

The present invention relates to a video encoding and decoding technique in a high-quality video compression method and apparatus for a security camera, and more particularly, to a method and apparatus for transmitting division information of a unit block of a video.

BACKGROUND

In recent years, there has been a growing demand for a variety of devices and systems for security, due to increasing social anxiety due to crime such as indiscriminate crimes against unspecified persons, retaliatory crimes against certain targets, and crimes against socially vulnerable classes. In particular, security cameras (CCTV) can be used as evidence for crime scenes or impression descriptions of criminals, thus demand for personal safety as well as national demand is increasing. However, due to the limited conditions in transmission or storage of acquired data, image quality deteriorates or there is a real problem that can be saved as a low-quality image. In order to utilize a variety of security camera images, a high-quality compression method capable of storing a high-quality image with a low data amount is required.

In the video compression technique, generally, the encoding/decoding of the image is not performed on the whole image. The encoding/decoding of the image is performed by dividing the image into blocks of a size suitable for encoding/decoding. The coding performance may be improved by the encoding/decoding unit of an appropriate size suitable for the characteristic of the image.

SUMMARY

It is an object of the present invention to provide a method and apparatus for transmitting information on a unit block for encoding/decoding of a high-quality image in a bitstream.

It is to be understood, however, that the technical problems of the present invention is not limited to the above-described technical problems, and other technical problems may exist.

As technical solutions for achieving the above object, an apparatus and a method for decoding an image according to one embodiment of the present invention comprises obtaining division information of a unit block from a bitstream, determining division of a block using the obtained division information, and decoding the image on a divided block basis using the determined division information.

It is an object of the present invention to provide a method and an apparatus for performing the image encoding/decoding through an efficient transmission method of division information of a unit block in the process of performing encoding/decoding of a block unit in order to improve coding efficiency.

According to an embodiment of the present invention, the coding performance may be improved by efficiently transmitting division information of a block to a decoder.

DETAILED DESCRIPTION

Figure 1:
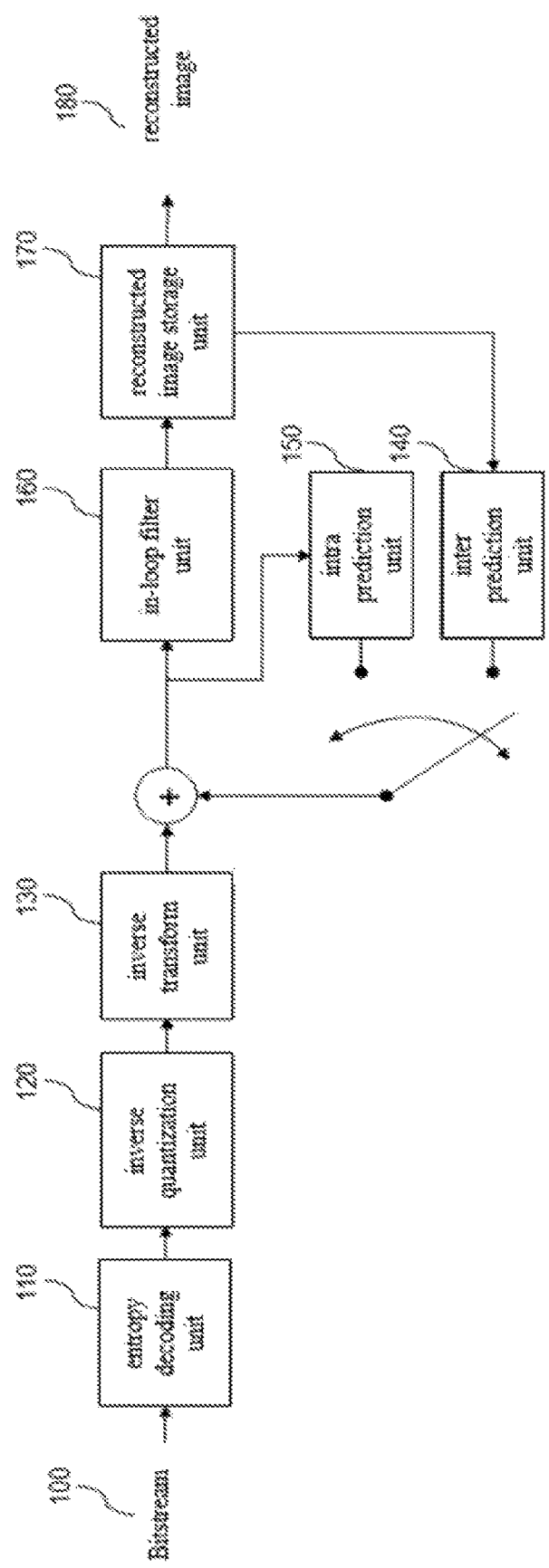
FIG. 1 illustrates a decoding apparatus according to an embodiment of the present invention.

Hereinafter, embodiments of the present invention will be described in detail with reference to the drawings attached hereto, so that those skilled in the art can easily carry out the present invention. The present invention may, however, be embodied in many different forms and should not be construed as limited to the embodiments set forth herein. In order to clearly illustrate the present invention, parts not related to the description are omitted in the drawings, and similar parts are denoted by similar reference numerals throughout the specification.

Throughout this specification, when a part is referred to as being 'connected' to another part, it includes not only a case where it is directly connected but also a case where the part is electrically connected with another part and there are other devices in between.

In addition, in the specification, when an element is referred to as being "comprising" an element, it is understood that the element may further comprise other elements without excluding other elements as long as there is no contrary description.

The term "~step" or "step of~" used in the present specification does not imply a step for~.

Also, the terms such as first, second, etc. may be used to describe various components, but the components should not be limited by the terms. The terms are used only for the purpose of distinguishing one component from another.

In addition, the components shown in the embodiments of the present invention are shown independently to represent different characteristic functions, and it does not mean that each component is composed of separate hardware or one software constituent unit. That is, each constituent unit is described separately for convenience of explanation, and at least two constituent units of constituent units may be combined to form one constituent unit or one constituent unit may be divided into a plurality of constituent units to perform a function. The integrated embodiments and the separate embodiments of each of these components are also included in the scope of the present invention without departing from the essence of the present invention.

First, the terms used in the present application will be briefly described as follows.

The video decoding apparatus may be a device included in the server terminal such as a personal security camera, a private security system, a military security camera, a military security system, a personal computer (PC), a notebook computer, a portable multimedia player (PMP), a wireless communication terminal, a smart phone, a TV application server, and a service server. The video decoding apparatus may be various devices including a user terminal such as various devices, a communication device such as a wired/wireless communication network, Communication modem to perform communication etc., various programs for inter-prediction or intra-prediction or for decoding an image, a memory for storing data, and a microprocessor for calculating and controlling by executing a program.

In addition, an image encoded into a bitstream by an encoder may be transmitted in real time or in non-real time via a wired or wireless communication network such as the internet, a local area wireless communication network, a wireless LAN network, a WiBro network, a mobile communication network, or via a cable, Universal Serial Bus (USB), and the like to an image decoding apparatus. The encoded image may be decoded and restored into an image, and then reproduced.

In general, a moving picture may be composed of a series of pictures, and each picture may be divided into a coding unit such as a block. It is to be understood that the term 'picture' described below may be replaced with other terms having an equivalent meaning such as an image, a frame, etc. The term 'coding unit' may be replaced with other terms having equivalent meanings such as a unit block, block, and the like.

Hereinafter, embodiments of the present invention will be described in detail with reference to the drawings. In the description of the present invention, duplicate descriptions will be omitted for the same components.

Figure 3:
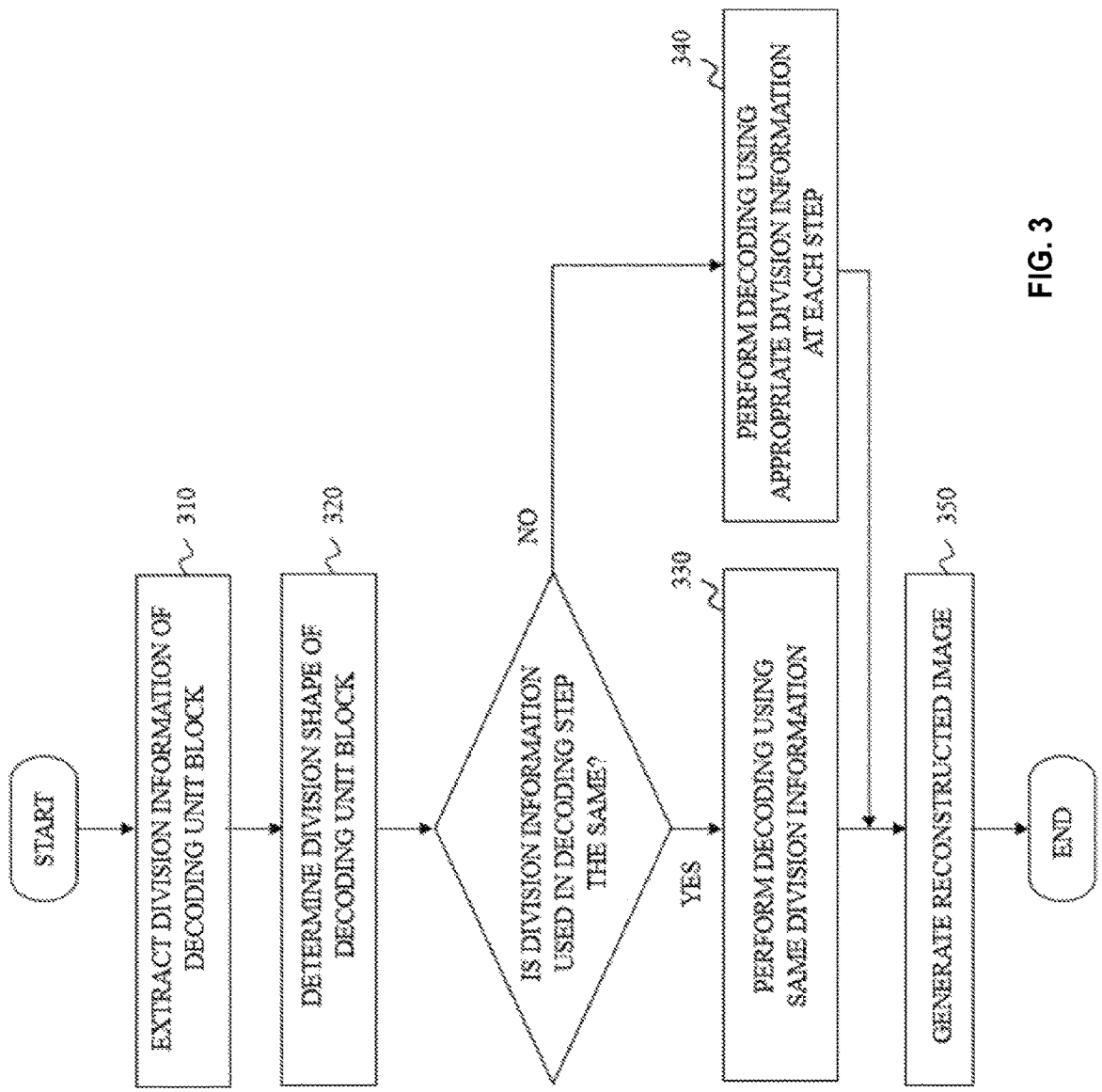
FIGS. 3 and 4 are flowcharts illustrating a method of extracting division information of a block and performing block-based decoding using the division information according to an embodiment of the present invention.

FIG. 3 is a flowchart illustrating a method of extracting division information of a block and performing decoding in a block unit using the division information according to an embodiment of the present invention.

Figure 4:
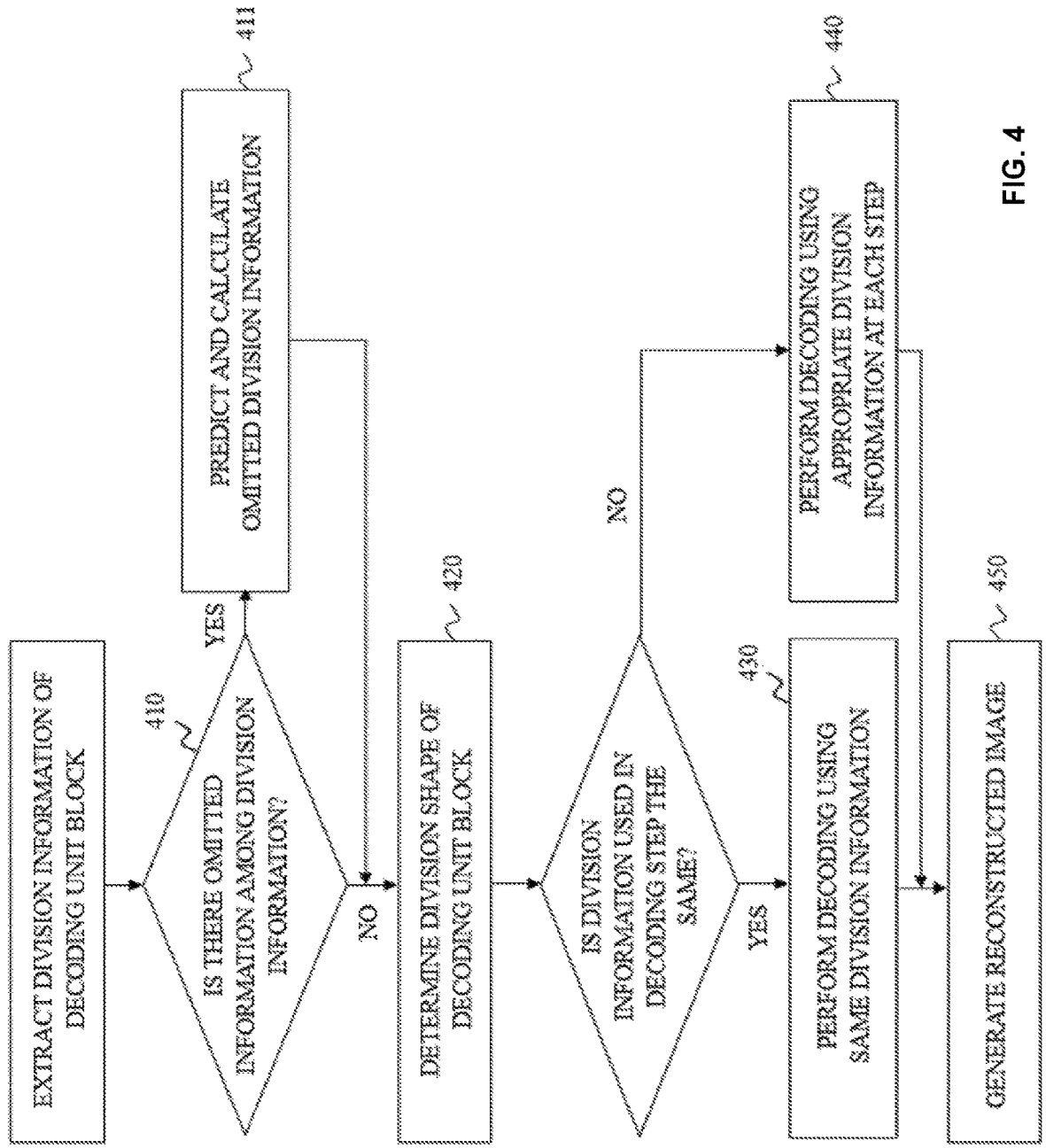

First, information on the division of a block is extracted from a bitstream (310). According to an embodiment of the present invention, the division information of the block may include a flag indicating whether to divide the block, a shape of the divided block, a size of the divided block, the minimum division size of the block, the maximum size of the block, the number of the division and the like. Also, according to the embodiment of the present invention as shown in FIG. 4, all of the division information may be extracted from the bitstream or only a part of the division information may be extracted from the bitstream if only a part of the division information is transmitted to a decoding apparatus. A part of the division information may not be signaled for coding efficiency and may be predicted or calculated by the decoder without the extraction process from the bitstream in the decoding apparatus (411). The decoding apparatus determines, based on the information extracted from the bitstream and the calculated information, the division shape of the block to be decoded (320). The decoding apparatus performs decoding according to the division shape. In this case, the division information of the block such as the division size and shape of the block in each step of decoding may be different from each other. The division information may be derived, based on the promise between the encoding apparatus and the decoding apparatus, by the decoding apparatus or may be extracted from the bitstream.

Hereinafter, embodiments of the present invention will be described in detail with reference to the drawings attached hereto, so that those skilled in the art can easily carry out the present invention. The present invention may, however, be embodied in many different forms and should not be construed as limited to the embodiments set forth herein. In order to clearly illustrate the present invention, parts not related to the description are omitted in the drawings, and similar parts are denoted by similar reference numerals throughout the specification.

Throughout this specification, when a part is referred to as being 'connected' to another part, it includes not only a case where it is directly connected but also a case where the part is electrically connected with another part and there are other devices in between.

In addition, in the specification, when an element is referred to as being "comprising" an element, it is understood that the element may further comprise other elements without excluding other elements as long as there is no contrary description.

The term "~step" or "step of~" used in the present specification does not imply a step for~.

Also, the terms such as first, second, etc. may be used to describe various components, but the components should not be limited by the terms. The terms are used only for the purpose of distinguishing one component from another.

In addition, the components shown in the embodiments of the present invention are shown independently to represent different characteristic functions, and it does not mean that each component is composed of separate hardware or one software constituent unit. That is, each constituent unit is described separately for convenience of explanation, and at least two constituent units of constituent units may be combined to form one constituent unit or one constituent unit may be divided into a plurality of constituent units to perform a function. The integrated embodiments and the separate embodiments of each of these components are also included in the scope of the present invention without departing from the essence of the present invention.

First, the terms used in the present application will be briefly described as follows.

The video decoding apparatus may be a device included in the server terminal such as a personal security camera, a private security system, a military security camera, a military security system, a personal computer (PC), a notebook computer, a portable multimedia player (PMP), a wireless communication terminal, a smart phone, a TV application server, and a service server. The video decoding apparatus may be various devices including a user terminal such as various devices, a communication device such as a wired/wireless communication network, Communication modem to perform communication etc., various programs for inter-prediction or intra-prediction or for decoding an image, a memory for storing data, and a microprocessor for calculating and controlling by executing a program.

In addition, an image encoded into a bitstream by an encoder may be transmitted in real time or in non-real time via a wired or wireless communication network such as the internet, a local area wireless communication network, a wireless LAN network, a WiBro network, a mobile communication network, or via a cable, Universal Serial Bus (USB), and the like to an image decoding apparatus. The encoded image may be decoded and restored into an image, and then reproduced.

In general, a moving picture may be composed of a series of pictures, and each picture may be divided into a coding unit such as a block. It is to be understood that the term 'picture' described below may be replaced with other terms having an equivalent meaning such as an image, a frame, etc. The term 'coding unit' may be replaced with other terms having equivalent meanings such as a unit block, block, and the like.

Hereinafter, embodiments of the present invention will be described in detail with reference to the drawings. In the description of the present invention, duplicate descriptions will be omitted for the same components.

FIG. 1 illustrates a decoding apparatus for performing image decoding on a block-by-block basis using division information of a block according to an embodiment of the present invention. The decoding apparatus may include at least one of an entropy decoding unit 110, an inverse quantization unit 120, an inverse transform unit 130, an inter prediction unit 140, an intra prediction unit 150, an in-loop filter unit 160, or a reconstructed image storage unit 170.

The entropy decoding unit 110 decodes the input bitstream 100 and outputs decoding information such as syntax elements and quantized coefficients. The output information may include division information of a block on which decoding is performed. The division information may be transmitted in various forms. Signaling of the division information may be omitted under certain conditions. The division information may be predicted or calculated by the decoding apparatus. The inverse quantization, inverse transform, inter prediction, intra prediction, motion compensation, and in-loop filtering may be performed on a block-by-block basis, and the size and shape of blocks used in each step may be the same or different. Information such as a block size or a block shape may be extracted from the bitstream through the division information or may be calculated or predicted using information extracted from the bitstream.

The inverse quantization unit 120 and the inverse transformation unit 130 receive the quantizated coefficient, perform inverse-quantization and inverse-transform, and output a residual signal.

The inter prediction unit 140 performs motion compensation using a motion vector obtained from the bitstream and a reconstructed image stored in the reconstructed image storage unit 170 to generate a prediction signal. The inter prediction unit 140 includes a step of performing motion compensation.

The intra prediction unit 150 generates a prediction signal of a current block by performing spatial prediction using pixel values of a decoded neighboring block adjacent to the current block to be decoded.

The prediction signals output from the inter prediction unit 140 and the intra prediction unit 150 are summed with the residual signal, and the reconstructed image generated through the summing is transmitted to the in-loop filter unit 160.

The reconstructed picture to which the filtering is applied in the in-loop filter unit 160 is stored in the reconstructed image storage unit 170 and may be used as a reference picture in the inter prediction unit 140.

Figure 2:
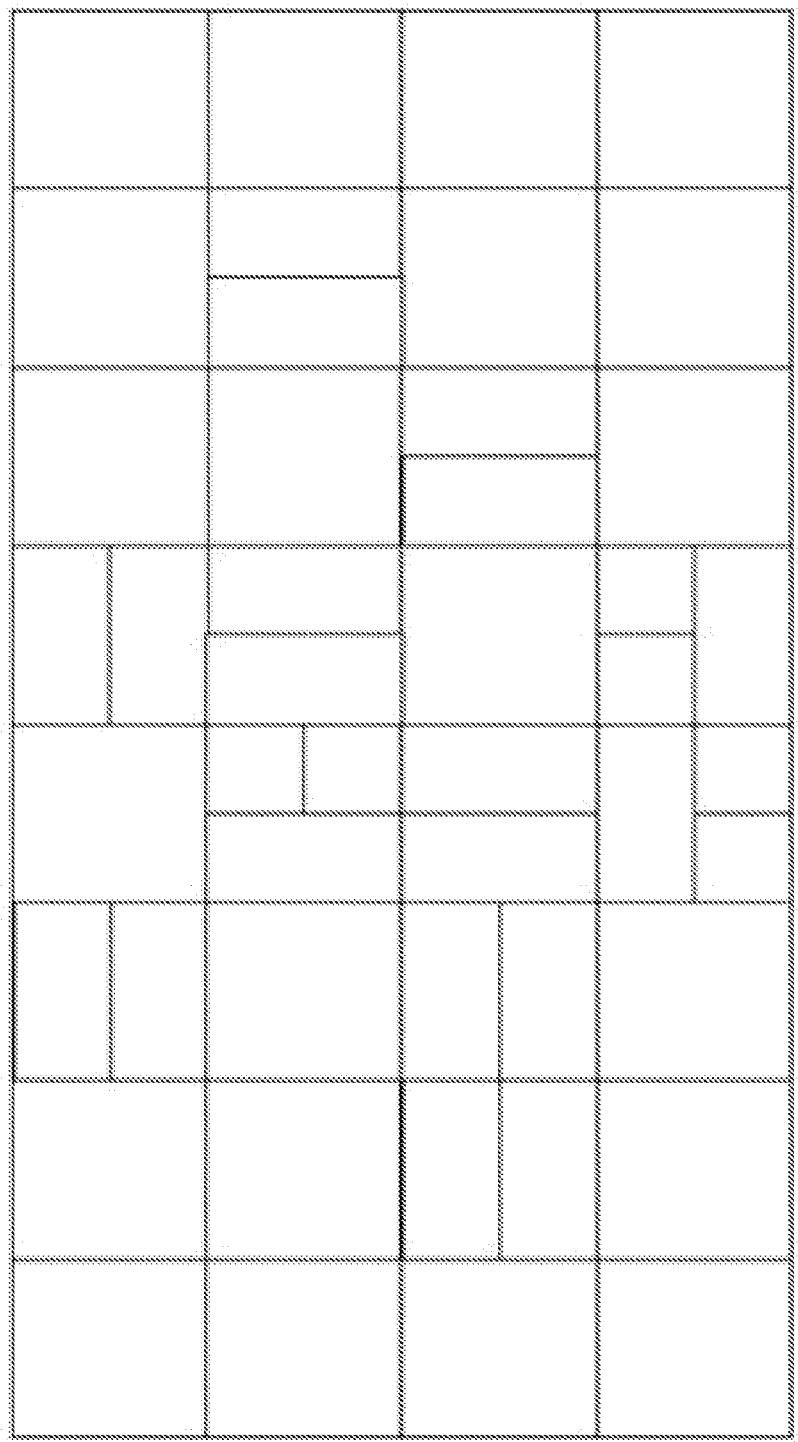
FIG. 2 illustrates a division shape of a block according to an embodiment of the present invention.

FIG. 2 illustrates a division shape of a block according to an embodiment of the present invention. For the efficiency of encoding/decoding, the encoding/decoding of the image is performed by dividing a block into a square or a rectangle as illustrated in the drawing. Like the embodiment of the present invention, the division information of the drawing may be obtained from the bitstream. The division information may be predicted or calculated in the decoding apparatus and may not be transmitted from the encoding apparatus.

An apparatus and method for decoding an image according to an embodiment of the present invention comprises the steps of obtaining division information of a unit block, determining division of a block using the obtained division information, and performing image decoding on a divided block basis. The division information may include information relating to whether or not to divide a block, division method, division type, and division direction. The division information may be extracted, from the bitstream, in the form of flags.

An image decoding apparatus and method according to an embodiment of the present invention comprises extracting information on a maximum size and a minimum size of a unit block from a bitstream, extracting information on the number of divisions, extracting information on a shape of the divided block, determining division of a block using the obtained division information, and performing image decoding by a block unit which determined based on the division information.

An apparatus and method for decoding an image according to an embodiment of the present invention comprises extracting division information of a unit block from a bitstream, and performing image decoding by a block unit which determined based on the division information. The division information may be extracted, from the bitstream, in the form of a block mode.

An apparatus and method for decoding an image according to an embodiment of the present invention may predict or calculate a minimum size of a unit block using a minimum unit of a prediction block and a minimum size information of a transform kernel. The division information may be predicted, calculated, and used based on the predicted information in a decoding apparatus. The decoding apparatus comprises a step of performing image decoding by a divided block unit, by using the division information.

An apparatus and method for decoding an image according to an embodiment of the present invention may predict or calculate division information of a current decoding block by using information of a neighboring block or a reference image. An apparatus and method for decoding an image according to an embodiment of the present invention comprises performing image decoding by predicting or calculating the division information in a decoding apparatus, without extracting division information from the bitstream.

The division of the block is generally performed in a square or a rectangle, but may also be a triangle, a polygon or an irregular shape according to an embodiment of the invention.

FIG. 3 is a flowchart illustrating a method of extracting division information of a block and performing decoding in a block unit using the division information according to an embodiment of the present invention.

First, information on the division of a block is extracted from a bitstream (310). According to an embodiment of the present invention, the division information of the block may include a flag indicating whether to divide the block, a shape of the divided block, a size of the divided block, the minimum division size of the block, the maximum size of the block, the number of the division and the like. Also, according to the embodiment of the present invention as shown in FIG. 4, all of the division information may be extracted from the bitstream or only a part of the division information may be extracted from the bitstream if only a part of the division information is transmitted to a decoding apparatus. A part of the division information may not be signaled for coding efficiency and may be predicted or calculated by the decoder without the extraction process from the bitstream in the decoding apparatus (411). The decoding apparatus determines, based on the information extracted from the bitstream and the calculated information, the division shape of the block to be decoded (320). The decoding apparatus performs decoding according to the division shape. In this case, the division information of the block such as the division size and shape of the block in each step of decoding may be different from each other. The division information may be derived, based on the promise between the encoding apparatus and the decoding apparatus, by the decoding apparatus or may be extracted from the bitstream.

Figure 5:
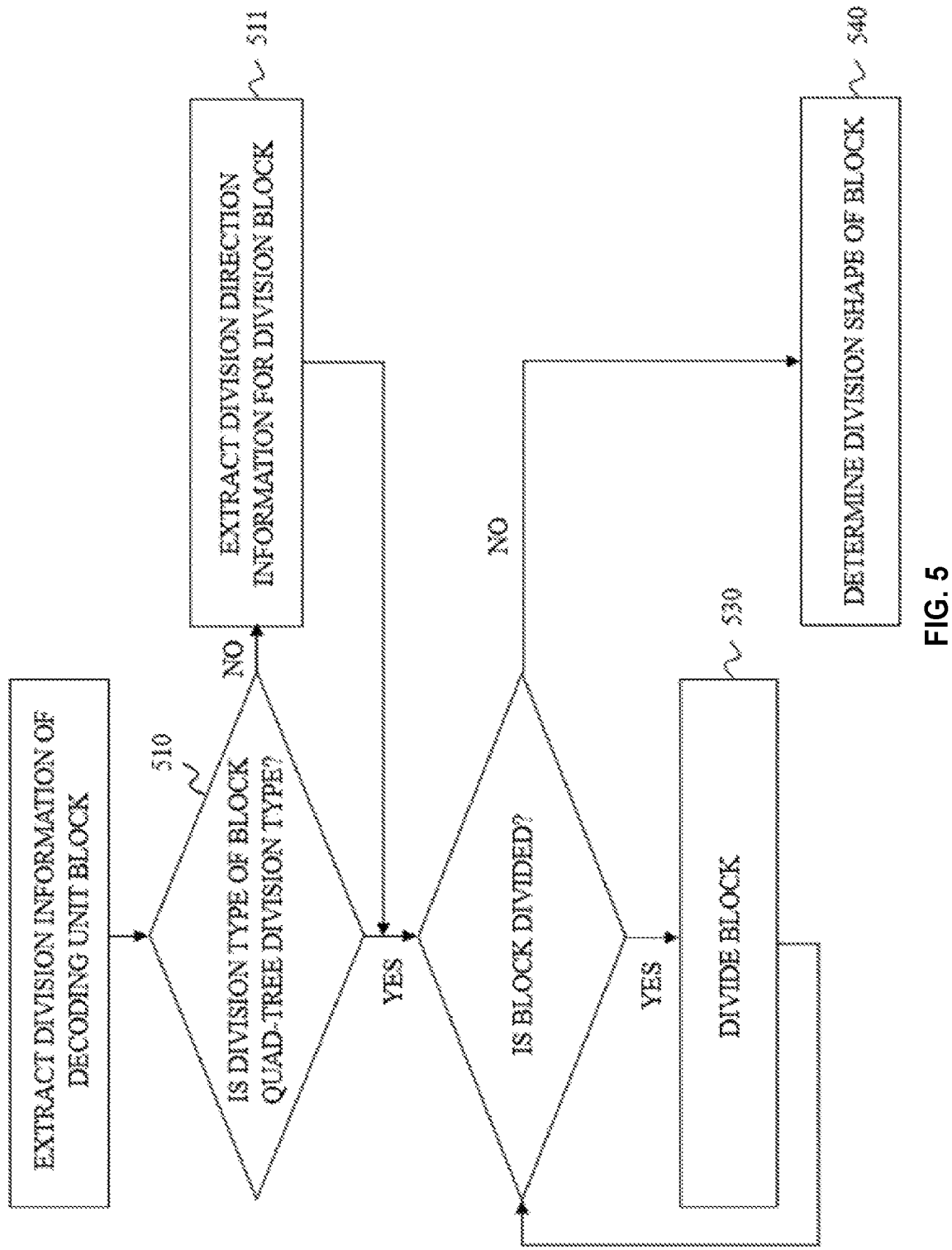
FIG. 5 is a flowchart illustrating a process of obtaining division information of a block according to an embodiment of the present invention.

FIG. 5 is a flowchart illustrating a process of determining a division shape of a block when division information of a block is extracted from a bitstream in the form of a flag in the embodiment of the present invention. First, information on the division type of the block is extracted among the division information of the block. The division type of the block is determined to be a quad-tree division type or a binary-tree division type. The division type of the block is determined based on a flag. If the division type of the block is a quad-tree division type, the block is divided based on a flag for determining whether to divide the block. With the progress of the division, each of the divided blocks has the flag for determining whether to divide the block. If the information indicates that the block is not divided any more, the division is stopped based on the information and the division shape of the block is determined. In the case of the binary-tree division type, a flag for determining whether to divide the block based on the binary-tree division and a flag for determining the direction of the division are required. Each of the divided block may have the said information while proceeding the division of the block through the direction of the division, that is, the horizontal or vertical direction. If the information indicates that the division is no longer valid, the division is stopped based on the information and the division shape of the block is determined. It is also possible to divide a block into a mixture of a square and a non-square. In this case, each of the divided blocks has flag information about the division shape and a flag indicating whether to divide the block.

In the embodiment of the present invention, some information may be omitted by the promise of the encoding and decoding apparatus in order to efficiently transfer the division information of the block. Some information is not extracted from the bitstream, but may be determined to be the pre-determined value or may be determined through prediction or calculation in the decoding apparatus. When the division of a block is performed in a specific type of a quad-tree division or a binary-tree division, the information on the division type of the block may be omitted. When the division of the block starts in a specific shape of the square or the non-square, flag information about the division type of the block may be omitted in the block where the division is started. When the block has the same division information in a transform process and a motion compensation process, the minimum size of the divided block can not be smaller than the size of the transform kernel. Therefore, in the block having the same size as the minimum size of the transform kernel, flag information on whether to divide the block may be omitted.

In addition, when there is a promise between the encoder and the decoder for the minimum size of a block or when information about the minimum size of the block is parsed in the bitstream, the block corresponding to the minimum size does not have information about whether to divide the block into sub-blocks. The block has a block shape of a square or a non-square. Even if the minimum size is not promised or transmitted, the minimum size of one side of a block can not be less than 1.

According to an embodiment of the present invention, when the maximum number of division times of a block is fixed or transmitted to a decoder through a bitstream, the divided blocks corresponding to the maximum number of division times do not have flag information about whether to divide into sub-blocks.

The present invention may be used in manufacturers such as broadcasting equipment manufacturing, terminal manufacturing, and industries related to original technology in video encoding/decoding related industries.

What is claimed is:

1. A method for decoding a video signal, with a decoding apparatus, comprising:
    determining, with the decoding apparatus, a current block by dividing a coding block,
    wherein the division of the coding block is performed recursively based on both a quad-division and a binary-division,
    wherein the quad-division is performed without extracting division information for the quad-division from a bitstream when a pre-determined condition is satisfied,
    wherein the binary-division is performed by using a plurality of flags extracted from the bitstream,
    wherein the plurality of flags include a first flag for indicating whether to use a binary-division type and a second flag for specifying a division direction of the binary-division, and
    wherein the second flag equal to a first value indicates a vertical direction while the second flag equal to a second value indicates a horizontal direction;
    obtaining, with the decoding apparatus, a residual signal by performing an inverse-quantization and an inverse-transform on quantized coefficients of the current block;
    generating, with the decoding apparatus, a prediction signal of the current block by performing an intra prediction based on reconstructed pixel values of a neighboring block; and
    reconstructing, with the decoding apparatus, the current block using the residual signal and the prediction signal.

2. The method of claim 1, wherein the division information includes at least one of a flag indicating whether to divide the coding block, a shape of a divided block, a size of the divided block, a minimum division size, a maximum division size or a maximum number of the division times.

3. The method of claim 1, further comprising:
    dividing the current block obtained based on the binary-division into a plurality of sub-regions,
    wherein at least one of the sub-regions has triangle shape.

4. The method of claim 1, wherein the inverse-quantization, the inverse-transform and the intra prediction are performed in units of blocks having a same size.

5. A non-transitory computer-readable storage medium having instructions stored thereon that, when executed, cause one or more processor to:
    determining a current block by dividing a coding block,
    wherein the division of the coding block is performed recursively based on both a quad-division and a binary-division,
    wherein the quad-division is performed without extracting division information for the quad-division from a bitstream when a pre-determined condition is satisfied, wherein the binary-division is performed by using a plurality of flags extracted from the bitstream, wherein the plurality of flags include a first flag for indicating whether to use a binary-division type and a second flag for specifying a division direction of the binary-division, and wherein the second flag equal to a first value indicates a vertical direction while the second flag equal to a second value indicates a horizontal direction;

obtaining a residual signal by performing an inverse-quantization and an inverse-transform on quantized coefficients of the current block;

generating a prediction signal of the current block by performing an intra prediction based on reconstructed pixel values of a neighboring block; and reconstructing the current block using the residual signal and the prediction signal.

* * * * *